United States Patent
Kane et al.

(10) Patent No.: US 9,434,793 B1
(45) Date of Patent: Sep. 6, 2016

(54) CONTINUOUS ADIABATIC INVERSE EMULSION POLYMERIZATION PROCESS

(71) Applicant: KANE & ASSOCIATES, LLC, Chandler, AZ (US)

(72) Inventors: James Kane, Chandler, AZ (US); James F. Durham, III, Columbus, GA (US)

(73) Assignee: Technology Investment & Development, LLC, Orlando, FL (US)

( * ) Notice: Subject to any disclaimer, the term of this patent is extended or adjusted under 35 U.S.C. 154(b) by 0 days.

(21) Appl. No.: 14/808,365

(22) Filed: Jul. 24, 2015

(51) Int. Cl.
| | | |
|---|---|---|
| *C08F 2/00* | (2006.01) | |
| *C08F 4/28* | (2006.01) | |
| *C08F 4/00* | (2006.01) | |
| *C08F 20/44* | (2006.01) | |
| *C08L 91/00* | (2006.01) | |
| *C08K 5/10* | (2006.01) | |
| *C08F 2/32* | (2006.01) | |
| *C08F 2/01* | (2006.01) | |
| *C08F 6/20* | (2006.01) | |
| *C08F 4/04* | (2006.01) | |

(52) U.S. Cl.
CPC . *C08F 2/32* (2013.01); *C08F 2/01* (2013.01); *C08F 4/04* (2013.01); *C08F 6/20* (2013.01)

(58) Field of Classification Search
CPC ....... C08F 2/32; C08F 20/18; B01J 19/2435; B01J 19/44
USPC .......... 524/801, 313, 318; 526/64, 227, 234, 526/317.1
See application file for complete search history.

(56) References Cited

U.S. PATENT DOCUMENTS

| | | |
|---|---|---|
| 3,975,341 A | 8/1976 | Trapasso et al. |
| 4,037,040 A | 7/1977 | Trapasso et al. |
| 4,727,110 A * | 2/1988 | Fan .......... C08F 2/32 524/801 |
| 4,764,574 A | 8/1988 | Clark, Jr. |
| 4,933,404 A | 6/1990 | Beckman et al. |
| 5,465,792 A | 11/1995 | Dawson et al. |
| 6,124,396 A | 9/2000 | Hahn et al. |
| 7,202,319 B2 | 4/2007 | Spindler et al. |
| 7,776,958 B2 | 8/2010 | Strominger et al. |

* cited by examiner

*Primary Examiner* — William Cheung
(74) *Attorney, Agent, or Firm* — Mahreen Chaudhry Hoda, Esq.; Carolyn S. Elmore, Esq.; Elmore Patent Law Group, P.C.

(57) ABSTRACT

The present invention provides a method for continuous polymerization of ethylenically unsaturated monomers in a water-in-oil inverse emulsion under adiabatic conditions without the need for external cooling during the polymerization. The method comprises neutralizing a monomer composition comprising at least one acidic vinyl monomer with a base in an aqueous medium comprising water and water ice to form an aqueous monomer solution therefrom; homogenizing and degassing to form an inverse monomer emulsion; initiating polymerization; passing the inverse emulsion through a tube reactor without cooling, and flash evaporating a portion of the water from inverse emulsion to cool and concentrate the resulting polymer-containing inverse emulsion. During neutralization, the aqueous medium comprises an amount of water ice sufficient to maintain a temperature of 30° C. or less, and the polymerization is initiated by adding a free-radical polymerization initiator to the emulsion prior to passing the emulsion through the tube reactor.

20 Claims, 1 Drawing Sheet

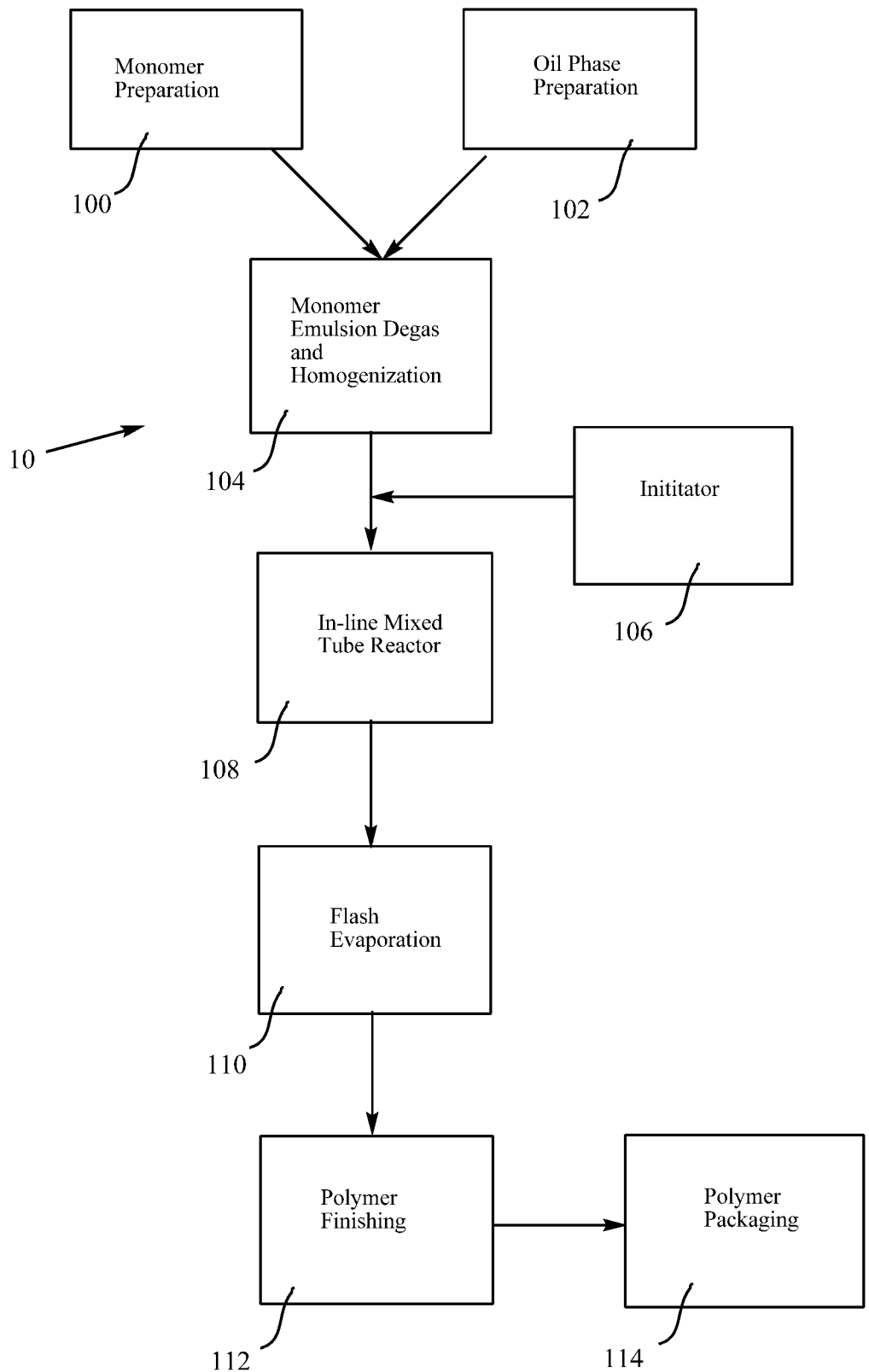

CONTINUOUS ADIABATIC INVERSE EMULSION POLYMERIZATION PROCESS

FIELD OF THE INVENTION

The present invention relates to inverse emulsion polymerization. More particularly, the invention relates to continuous adiabatic inverse emulsion polymerization.

BACKGROUND

Inverse emulsions (i.e., water-in-oil emulsions) are commonly used to prepare high molecular weight water-soluble and water-swellable polymers. The inverse emulsion medium allows liquid, flowable polymer compositions to be prepared, which when added to water in the presence of an appropriate surfactant, will "invert" to form an aqueous solution or an oil-in-water emulsion. Inverse emulsion polymerization is used in these cases because direct polymerization in bulk water solution would generally lead to unacceptably high viscosities, undesired gelling, in efficient mixing, and other problems associated with very high molecular weight water soluble polymers. These problems can be avoided in the inverse emulsion medium, because the high viscosity aqueous phase that results from the polymerization reaction is dispersed as droplets in a relatively low viscosity oil phase, maintaining fluidity of the bulk emulsion.

Uncontrolled polymerizations, i.e., "runaway" reactions, are a constant and dreaded concern to producers of inverse emulsion polymers. Runaways can lead to catastrophic breaking of the emulsion and formation of an intractable gel/bulk polymer mass in the polymerization reactor, or to formation of large quantities of insoluble and soluble gel suspended in the oil phase, rendering the entire product worthless. Neither outcome is desirable. Reactors can become so fouled that complete cleaning is not possible or practical, and the reactor must be scrapped. The gel-containing runway products not only waste the costs of starting materials and labor involved in the production process, but also add costs for disposal of the unusable product.

In order to avoid runway inverse emulsion polymerization reactions, sophisticated reaction temperature control systems, incremental initiator feeds, higher speed agitation, and other expensive expedients must be utilized during convention inverse emulsion polymerization processes. When such controls are implemented, reaction times for the polymerization reactions can increase to several hours. Fundamentally, free radical polymerization reactions in the small aqueous droplets present in the inverse emulsions have the potential for much shorted reaction times, were it not for all of the control features that must be implemented, which effectively slow the reaction. Because of the many difficulties discussed above, there is an ongoing need for new inverse emulsion polymerization processes that can be efficiently carried out without sophisticated and expensive reaction controls. The methods described herein address this need.

SUMMARY

The present invention provides a method for continuous polymerization of ethylenically unsaturated monomers in a water-in-oil inverse emulsion under adiabatic conditions without the need for external cooling during the polymerization. The method comprising the following steps of:

(a) neutralizing a monomer composition comprising at least one water-soluble, oil-insoluble, ethylenically unsaturated acidic monomer (e.g., acrylic acid and/or methacrylic acid) with a base (e.g., ammonium hydroxide, sodium hydroxide, potassium hydroxide, and the like) in an aqueous medium comprising water and water ice to form an aqueous monomer solution therefrom;

(b) homogenizing the monomer solution with an oil phase in the presence of an emulsifier to form a water-in-oil inverse emulsion therefrom;

(c) degassing the inverse emulsion;

(d) initiating polymerization of the neutralized monomer composition after the homogenizing and degassing;

(e) after initiating polymerization, passing the inverse emulsion through a tube reactor comprising inline static mixing elements, without cooling, at a flow rate sufficient to achieve a preselected degree of polymerization as the inverse emulsion exits the tube reactor; and (e) flash evaporating a portion of the water from inverse emulsion after it exits the tube reactor to cool and concentrate the resulting polymer-containing inverse emulsion;

wherein during neutralization of the monomer composition, the aqueous medium comprises an amount of water ice sufficient to maintain the monomer solution at a temperature of 30° C. or less; and the polymerization is initiated by adding a free-radical polymerization initiator composition to the inverse emulsion prior to passing through the tube reactor.

Optionally, the monomer composition can include one or more water-soluble nonionic monomer (e.g., acrylamide) and/or one or more water-soluble cationic monomer (e.g., a quaternary ammonium-substituted or tertiary amine-substituted acrylamide or acrylate ester).

In some embodiments, the polymerization initiator comprises a thermal initiator, e.g., one or more material selected from the group consisting of an azo compound, an organic peroxide, and a dialkyl hyponitrite. In addition, or alternatively, the polymerization initiator can comprises a redox pair initiator composed of an oxidizing agent (e.g., hydrogen peroxide, an organic hydroperoxide, a bromate salt, and/or a chlorate salt) and a reducing agent (e.g., a metabisulfite salt, a formaldehyde sulfoxylate salt, complexed $Fe^{2+}$ ion, and/or ascorbic acid). Preferably, a thermal initiator and an oxidizing agent of a redox initiator pair are added to the aqueous monomer solution and oil phase prior to the homogenizing and degassing, and a reducing agent is added to the inverse emulsion after homogenizing and degassing, and before the passing of the monomer solution through the tube reactor.

Surprisingly, the continuous inverse emulsion polymerization methods described herein proceed adiabatically, without external cooling during the polymerization reaction, and without catastrophic emulsion breaking or undesirable soluble or insoluble gel formation. A number of features of the process are believed to contribute, in aggregate, to the unexpected and surprising robustness of the process. In particular relatively short residence time of the emulsion in the tube reactor, followed by evaporative cooling of the polymerized emulsion are important factors.

BRIEF DESCRIPTION OF THE DRAWINGS

FIG. 1 provides a flow chart for the inverse emulsion polymerization described herein.

DETAILED DESCRIPTION

The present invention provides a method for continuous polymerization of ethylenically unsaturated monomers in a water-in-oil inverse emulsion, under adiabatic conditions without the need for external cooling during the polymerization. The method comprises a number of steps. One step comprises neutralizing a monomer composition comprising at least one water-soluble, oil-insoluble, ethylenically unsaturated acidic monomer with a base in an aqueous medium comprising water and water ice to form an aqueous monomer solution therefrom. Another step comprises homogenizing the monomer solution with an oil phase in the presence of an emulsifier to form a water-in-oil inverse emulsion therefrom. The inverse emulsion also is subjected to a degassing step, which can be performed at the same time as the homogenization step or after homogenization. Once the degassed inverse emulsion is formed, polymerization is initiated by a polymerization initiator. Preferably, the initiator comprises a redox initiator pair in which one component (preferably the oxidizing agent) is present prior to forming the inverse emulsion, and the other component of the pair (preferably the reducing agent) is added after the inverse emulsion is formed. The polymerization proceeds while passing the inverse emulsion through a tube reactor comprising inline static mixing elements, without external cooling of the reactor, at a flow rate sufficient to achieve a preselected target degree of polymerization as the inverse emulsion exits the tube reactor. Preferably, a thermal polymerization initiator also is present in the inverse emulsion, which is activated by the heat of reaction of the polymerizing monomers that are initially catalyzed by free radical formed from the combination of oxidizing agent and reducing agent of the redox pair. After the polymerized emulsion exits the tube reactor, a portion of the water of the inverse emulsion is flash evaporated to cool and concentrate the resulting polymer-containing inverse emulsion product. During neutralization of the monomer composition, the aqueous medium comprises an amount of water ice sufficient to maintain the monomer solution at a temperature of 30° C. or less. Polymerization is initiated by adding a free-radical polymerization initiator composition to the inverse emulsion prior to passing through the tube reactor.

In a preferred embodiment, the polymerization initiator system is a combination of a redox initiator pair (an oxidizing agent and a reducing agent) and a thermal initiator. $NaBrO_3$ (the oxidizing agent of the redox initiator) and VAZO 52 (2,2'-azobis(2,4-dimethyl)valeronitrile, the thermal initiator) are added to the crude emulsion prior to degassing and homogenization. Sodium meta bisulfite (SMBS) is then added to that emulsion after degassing and homogenization, but prior to the pumping the resulting water-in-oil monomer inverse emulsion through the tube reactor, preferably just prior. In some preferred embodiments, the initiator concentrations are as follows: (a) about 0.05 to about 0.06 percent by weight (wt %), based on the of the total emulsion weight of $NaBrO_3$ (e.g., added as a 5% (w/w) aqueous solution), (b) about 0.0096 to about 0.0112 wt % of SMBS (e.g., added as 3.2% (w/w) aqueous solution), and (c) 0.03 wt % of 2,2'-azobis(2,4-dimethyl)valeronitrile (e.g., added as a 10% (w/w) VAZO 52 solution).

Non-limiting examples of suitable commercially available emulsifying surfactants include, but are not limited to, sorbitan monooleate surfactants available under the trade designation ATLAS from Croda USA (New Castle, Del.), such as ATLAS G-946; and sorbitan monooleate surfactants available under the trade designation SPAN from Croda USA (New Castle, Del.), such as SPAN 20 or SPAN 80. In some preferred embodiments, the emulsifiers used to create the water-in-oil emulsion are nonionic surfactants, such as a blend of a nonionic sorbitan ester and a nonionic polymeric ester-based surfactant, for example, a blend of a sorbitan monooleate such as SPAN 80 (CAS#1338-43-8) and a polymeric nonionic surfactant such as HYPERMER 2524 or HYPERMER 1031, preferably in a weight ratio of sorbitan monooleate-to-polymeric surfactant in the range of about 2:3 to about 3:2. The blend is added to the mixture of oil phase and aqueous monomer solution prior to degassing and homogenization at a concentration of about 1.6 to about 2 wt %.

A typical monomer concentration range in the processes described herein is about 28 to about 32 wt %. In a typical inverse emulsion according to the processes of the present invention, the oil to water weight ratio is about 21-23 wt % oil phase to about 79-77 wt % water.

Typically, about 10% of the water is removed by the flash evaporation (i.e., about 18-20 pounds per minute based on an emulsion flow rate of about 185 pounds per minute). Under these conditions, an inverse emulsion of the polymer product with an initial solids concentration of about 32 wt % can be increased to about 36 wt %.

Optionally, the resulting polymer can be subjected to various finishing processes after cooling. For example, the cooled polymer inverse emulsion can be diluted with a "blank" inverse emulsion (i.e., just oil phase, water, and surfactants) to adjust the solids to a market standard range such as about 22 to about 27% solids. In addition, a breaker surfactant package (i.e., surfactant to aid in inverting the emulsion upon addition to water) can be added to the reduced solids product prior to transfer to a bulk storage tank. The breaker package typically is a combination of surfactants with HLB values in the range of about 9 to about 12. Typically, the surfactants are ethoxylated alcohols, e.g., TERGITOL NP-10 (nonylphenol ethoxylate, CAS#127087-87-0), TRITON CF-76 (4-Nonylphenoxy polyethoxy polypropoxy ethyl acetal, CAS#160799-28-0), TRITON X100 (octylphenol ethoxylate, CAS#: 9036-19-5), and the like.

FIG. 1 provides a flow chart for the continuous inverse emulsion polymerization process 10. As shown in FIG. 1, the process involves preparation of the monomer solution 100, which is combined with oil phase 102, to form a reaction mixture which is and subjected to homogenization and degassing steps 104. A redox initiator oxidizing agent (e.g., sodium bromate) and a thermal initiator (e.g., an azo compound) also are present in the reaction mixture prior to homogenization. The resulting homogenized, degassed inverse emulsion is then combined with a redox reducing agent 106 (e.g., aqueous sodium metabisulfite) just prior to pumping the monomer emulsion through the in-line tube reactor 108. The polymerization proceeds adiabatically within the tube reactor 108 and the resulting polymer emulsion exits from the tube reactor and is cooled and concentrated by a flash evaporation 110. The cooled, concentrated polymer inverse emulsion can then be further processed in a finishing step 112 (e.g., dilution to a specified commercial concentration, addition of a breaker surfactant, and the like), and is then prepared for storage and distribution in packaging step 114.

Acrylic Acid Neutralization and Cooling System.

For most high molecular weight acrylamide/acrylic acid copolymers and other polymers and copolymers comprising an acidic unsaturated monomer (e.g., acrylic acid), the acidic monomer is neutralized with a base to form a salt before polymerization. The heat of neutralization for acrylic acid is in excess of 14 kcals per mole. In order to maintain monomer integrity, the monomer solution temperature is maintained at or less than about 30° C. The standard technique for controlling temperature during the neutralization is the use of an external cooling tower or a chilled water cooler around the neutralization tank. The acidic monomer (e.g., acrylic acid) typically is pumped into a basic aqueous solution within that tank. The pumping rate of the acid is directly proportional to the cooling capacity of the neutralizing tank. Such indirect cooling techniques are dependent on temperature differentials, heat transfer coefficient of the cooling surface, the cooling surface area, and the mixing efficiency of the agitation system used in the neutralization tank. Indirect cooling adds complexity and costs to the polymerization process. In contrast, the methods described herein eliminate the dependent variables listed above by the direct concomitant addition of water ice, base (e.g., ammonium hydroxide), and the acidic monomer (e.g., acrylic acid) to water in a stirred reactor vessel. This approach provides a direct cooling system that utilizes the latent heat of fusion of the ice, coupled with the heat capacity of the resultant solution to maintain a desirably low reaction temperature while neutralizing the acidic monomer. The direct cooling procedure can be readily performed on a scale sufficient to afford more than enough neutralized monomer to provide a polymer production rate of up to 30 gallons per minute (e.g., 30 gallons of polymer inverse emulsion product with solids levels of 30 to 60 percent by weight).

Monomer Emulsion Degas (Deoxygenation) System.

Deoxygenating the monomer inverse emulsion is required for polymerization, since oxygen acts as a polymerization inhibitor. In most systems, a dissolved oxygen level of less than about 1 part per million (ppm) is required before initiation of polymerization will begin. The standard degassing process currently in use in the industry is the addition of nitrogen or another suitable inert displacement gas into the air saturated monomer emulsion. This process takes place in the confines of a top mixed batch reactor. In some cases a mild vacuum is pulled within the batch reactor. Some variables controlling degassing effectiveness are, e.g., (a) the relative solubility of oxygen in the solvent in which it is dissolved; (b) the temperature of the solvent being degassed; (c) the contact surface area between the inert displacement gas and the solvent; and (d) the absolute pressure exerted on the solvent during degassing. The degree to which the temperature of the monomer emulsion can be increased (higher temperature aids in degassing) is limited to the target start temperature for polymerization. In addition, the surface contact of the nitrogen or other inert gas with the solvent is limited by the gas dispersing equipment positioning and design, the bubble size, and the like, which are aggravated when large reactor sizes and inefficient nitrogen distribution systems are employed. Because of these variables, the degassing step is one of the most time consuming steps associated with the batch radical polymerization processes.

In the methods described herein, degassing preferably is performed under vacuum (e.g., less than 1 pound per square inch) in a high speed (e.g., about 900 to 6000 rpm) rotating disk system, such as a degasser sold under the tradename VERSATOR by the Cornell Machine Company. Nitrogen saturated monomer emulsion is continuously fed to the center of the rotating disk, which rapidly converts the monomer emulsion stream to a thin film due to centrifugal force. The thin film is then exposed to an absolute pressure of less than 1 pound per square inch (psi). A monomer inverse emulsion flow rate of up to 20 gallons per minute can be degassed from 8 ppm oxygen to less than 0.5 ppm using such a system.

Inline Tube Reactor

The tube reactor preferably comprises a series of serially connected sanitary grade, 316 stainless steel tubes, with six inch outer diameter (o.d.) tubing. The tubes are fitted with in-line static mixers, which provide reactant mixing while maintaining plug flow characteristics through the tubing. The first tube preferably is fitted with a mass flowmeter and each tube is fitted with a temperature sensor. The extent of polymerization can be monitored using the mass flow rate and the mass temperature profile of the tubes, and the known heat of polymerization for the polymer being produced. Preferably, a modulated pressure regulator valve is included in the reactor to prevent boiling of the emulsion during the polymerization process. The polymerization typically is complete within 6 to 10 minutes in the methods described herein, so the residence time in the tube reactor typically also is within this time frame.

Flash Evaporator Cooling and Concentrating

One of the most challenging aspects of a batch process polymerization process is providing adequate cooling during polymerization. This is most commonly due to under designed cooling systems which include cooling tower water and chilled water. This situation is further exacerbated by limited cooling surfaces designed into the batch reactor. To cope with this problem batch reactor processes often use sequential initiator additions or air stops or both, in addition to conventional cooling, to control reaction temperature. In contrast, the continuous processes described herein run under adiabatic conditions (without cooling or external temperature control) and produce a product which meets or exceeds quality standards required by the marketplace. In the processes described herein, cooling is not used during the polymerization process; however, a polymer cool down step after the reaction is complete is required for safe handling by plant operators, and in the finishing and packaging processes.

Flash evaporation provides a mechanism to remove the heat of reaction at the end of the rapid polymerization process of the present invention, with the added benefit of concentrating the polymer emulsion solids. Flash evaporation cools by removing excess heat through generation of steam, which carries the heat away from the liquid emulsion. The removal of water in the form of steam provides higher solids products, which in turn result in lower freight costs and lower storage volume requirements. Flash evaporators are widely used by the oil refining and desalination industries, but have not been commonly used in inverse emulsion polymerization processes. In the processes described herein, the product polymerized emulsion exiting from the tube reactor is channeled into a low pressure flash tank, where the residual heat of polymerization present in the emulsion as it exits the tube reactor, along with the back pressure the tube reactor, result in rapid evaporation of a portion of the water present in the polymer inverse emulsion to form steam. This steam is removed by condensation in a separate vessel, and the resultant polymer emulsion is cooled by the heat of vaporization, and concentrated by the loss of water. The resultant product can now be safely handled by plant operators.

In some preferred embodiments, the interior of the flash evaporator is constructed of polished sanitary 316 stainless steel to facilitate in-place cleaning of the evaporator. Preferably, a sanitary polish finish is applied to all fluid-handling components of the evaporator, such as the throttle valve of the evaporator, which regulates flow to a distribution header, and the holes in the distribution header of the evaporator. Polished surfaces reduce the dynamic shear placed on the polymer emulsion at the moment of flash, which greatly enhances the polymer emulsion stability during the flash evaporation. The evaporator also preferably includes an antifoam spray head to mitigate foaming that may occur during the flash operation.

Initiators

Any free radical initiator capable of initiating acrylic polymerization can be utilized in the methods described herein. Such free radical initiators are well known to those of ordinary skill in the polymerization arts. Non-limiting examples of some free radical initiators useful in the methods described herein include thermal initiators such as azo compounds (e.g., 2,2'-azobisisobutyronitrile (AIBN), 1,1'-azobis(cyclohexanecarbonitrile), 2-t-butylazo-2-cyanopropane, 2,2'-azobis(2,4-dimethylvaleronitrile), 2,2'-azobis(2-amidinopropane)hydrochloride, 2-t-butylazo-2-cyanopropane, 2-t-butylazo-2-cyanobutane, 2-t-butylazo-1-cyanocyclohexane, 2-t-butylazo-2-cyano-4-methoxy-4-methylpentane, and the like); organic peroxide compounds (e.g., dibenzoyl peroxide, di-t-butyl peroxide, bis-dodecanoyl peroxide, t-butyl peroxyacetate, and the like), and dialkyl hyponitrites (e.g., di-t-butyl hyponitrite, di-t-amyl hyponitrite, and the like); as well as redox initiators comprising an oxidizing agent (e.g., persulfate such as potassium persulfate or ammonium persulfate; hydrogen peroxide, an organic hydroperoxide such as, t-butyl hydroperoxide, p-menthane hydroperoxide, and the like; a bromate such as sodium or potassium bromate; a chlorate such as sodium or potassium chlorate, and the like) combined with a suitable reducing agent (e.g., sodium, potassium or ammonium metabisulfite, a formaldehyde sulfoxylate salt such as zinc formaldehyde sulfoxylate or sodium formaldehyde sulfoxylate, complexed $Fe^{2+}$ ion such as $FeSO_4$ complexed with tetrasodium salt of ethylenediaminetetraacetic acid (EDTA), ascorbic acid, and the like).

In some embodiments, the initiator comprises a combination of a thermal initiator and a redox initiator. When a redox initiator is used, one component thereof (e.g., the oxidizing agent) preferably is present in the reaction mixture prior to degassing and homogenization, and the other component of the redox initiator (e.g., the reducing agent) is added to the degassed, homogenized inverse emulsion prior to passing the emulsion through the tube reactor, preferably through multiple injection ports to facilitate thorough mixing. When a thermal initiator is used, it is preferably added prior to degassing and homogenization.

Preferably, the initiator composition comprises a combination of thermal initiator and a redox initiator. In some preferred embodiments, the thermal initiator comprises an azo compound such as 2,2'-azobis(2,4-dimethylvaleronitrile) and similar materials), the oxidizing agent of the redox initiator comprises a bromate, such as, sodium bromate), and a reducing agent of the redox initiator comprises metabisulfite salt such as sodium metabisulfite.

Monomers

Monomers useful in the methods described herein are water-soluble, oil-insoluble ethylenically unsaturated ("vinyl") monomers, e.g., anionic vinyl monomers, nonionic vinyl monomers, and cationic vinyl monomers.

Non-limiting examples of anionic vinyl monomers include salts (e.g., ammonium, alkali metal or alkaline earth metal salts) of acrylic acid, methacrylic acid, acrylamidosalicylic acid, methacrylamidosalicylic acid, 2-sulfoethylacrylate, sodium styrene sulfonate, vinylbenzyl sulfonates, 3-allyloxy-2-hydroxypropane-1-sulfonic acid, 2-acrylamido-2-methylpropane sulfonic acid (AMPS), olefinic dicarboxylic acids (e.g. maleic acid and itaconic acid), and the like.

Non-limiting examples of nonionic vinyl monomers include acrylamide, N-alkyl acrylamide (e.g., $C_1$ to $C_3$ alkyl), methacrylamide, vinyl acetate, N-vinyl lactam monomers (e.g., N-vinylpyrrolidone, N-vinylcaprolactam)N-vinylformamide, N-vinylacetamide, N-methyl-N-vinylacetamide, vinyl ethers (e.g., glycidylvinyl ether, isobutylvinyl ether, hydroxybutylvinyl ether, diethyleneglycolvinyl ether, vinyloxobutylene polyethylene glycol (with a hydroxy or alkyl terminus), allyl ethers (e.g., 3-allyloxy-1,2-propanediol, allylglycidyl ether, allylethyl ether, 2-allyloxyethanol, and 1,1,1-tris(hydroxymethylpropane)monoallyl ether), and the like.

Non-limiting examples of cationic vinyl monomers include vinyl monomers bearing an amino or quaternized amino group such as vinylbenzyl trimethylammonium chloride, 2-aminoethylvinyl ether, dimethylaminoethyl methacrylate, amino ethylmethacrylate, 2-methacryloyloxyethyltrimethylammonium halide (e.g., chloride), diallyldimethylammonium chloride (DADMAC), 3-methacrylamidopropyltrimethylammonium chloride, and the like In some preferred embodiments, the monomer mixture comprises one or more acrylic monomer such as an anionic acrylic monomer (e.g., an acrylic acid salt and/or a methacrylic acid salt) and/or a non-ionic acrylic monomer (e.g., acrylamide and/or methacrylamide).

Optionally, the monomer mixture can include minor amounts (e.g., less than 10 mol %, less than 5 mol %, less than 1 mol %, less than 0.1 mol % or less than 0.01 mol %) of one or more cross-linking monomers such as bis-acrylamides and bis-acrylic acid esters which are linked together by means of alkylidene, phenylene, benzylidene, cyclohexylidene, hydroxyalkylene or oxyalkylene groups.

Emulsifiers

Any emulsifiers suitable for forming a water-in-oil inverse emulsion can be utilized in the methods described herein. Such emulsifiers are well known to those of ordinary skill in the polymerization arts. Non-limiting examples of some emulsifiers useful for forming inverse emulsions in the methods described herein include, e.g., carboxylic esters of sorbitan (e.g., sorbitan esters of lauric acid, stearic acid, oleic acid, behenic acid, and the like, such as sorbitan monooleate, sorbitan monostearate, sorbitan monolaurate, sorbitan monopalmitate, sorbitan tristearate, sorbitan trioleate, and the like), polyethoxylated sorbitan esters in having polyoxyethylene groups comprising about 4 to 20 oxyethylene groups (e.g., polyoxyethylene (20) sorbitan monolaurate (TWEEN 20), polyoxyethylene (20) sorbitan monopalmitate (TWEEN 40), polyoxyethylene (20) sorbitan monostearate (TWEEN 60), polyoxyethylene (4) sorbitan monostearate (TWEEN 61), polyoxyethylene (20) sorbitan tristearate (TWEEN 65), polyoxyethylene (20) sorbitan monooleate (TWEEN 80), and polyoxyethylene (20) sorbitan trioleate (TWEEN 85), and the like), diglycerol monostearate and ethoxylated derivatives thereof, polyethoxy substituted phenols (e.g., polyethoxy octyl phenol (TRITON X-15) and polyethoxy nonyl phenol (TRITON N), and the like), polyethoxylated alcohols (e.g., polyoxyethylene(2) cetyl alcohol, polyoxyethylene cetyl/stearyl alcohol, and the like), carboxylic acid esters (e.g., methyl soyate, ethyl soyate, methyl palmitate, methyl stearate, methyl oleate, methyl linolate, methyl linolenate, and the like), ethoxylated amines, and polymeric ester-based surfactants. Such surfactants are well known to those of ordinary skill in the polymer and emulsion arts.

In some embodiments, the emulsifier can include one or more nonionic polymeric surfactant comprising a nonionic polymer having hydrophilic and hydrophobic units along the nonionic polymer chain. Exemplary nonionic polymer surfactants are commercially available under the trade designation HYPERMER from Croda USA (New Castle, Del.). In one desired embodiment, a polymeric surfactant commercially available under the trade designation HYPERMER 1031 from Croda USA (New Castle, Del.) is used as at least one emulsifier.

In some embodiments, the emulsifier can be a combination of two or more nonionic surfactants, e.g., surfactants having a hydroxyl-containing hydrophilic portion (e.g., sorbitan) and a hydrocarbon-based lipophilic portion (e.g., $C_6$ to $C_{22}$ alkyl or arylalkyl), and having different hydrophilic-lipophilic balance (HLB) values. For example, one surfactant may have a relatively low HLB (e.g., 2 to 6), another surfactant may have a mid-range HLB (e.g., 7 to 9) and/or another surfactant may have a relatively high HLB (e.g., 9 to 16).

Oil Phases

Any oil phase useful for inverse emulsion polymerization can be utilized in the methods described herein. Such oil phases are well known to those of ordinary skill in the polymerization arts. Non-limiting examples of some oil phases useful in the methods described herein include, e.g., cyclohexane, toluene, heptane, benzene, petroleum ether or mineral oils, xylene, o-dichlorobenzene, monochlorobenzene, ethylene dichloride, and the like.

Polymers

The polymers produced by the methods described herein can be homopolymers or copolymers. As used herein the term "copolymer" refers to any polymer that include more than one different monomer unit. In some embodiments, the polymers are homopolymers and copolymers of anionic, nonionic and/or cationic monomers, e.g., such as acrylamide, acrylic acid, methacrylic acid, methacrylamide, N-hydroxyacrylamide, N-hydroxymethacrylamide, acrylamidosalicylic acid, methacrylamidosalicylic acid, tertiary ammonium-substituted acrylamides, and the like. The polymers produced by inverse emulsion polymerization, including the methods described herein, generally have high molecular weight (i.e., weight average molecular weights) of greater than 100,000, greater than 500,000, greater than 1,000,000, or greater than 5,000,000 g/mol.

Optional Ingredients

Optionally other materials besides the monomers, initiators, oil phase and emulsifiers can be added to the polymerization, such as gel inhibitors (e.g., isopropyl alcohol, isobutyl alcohol, glycerol and 1,3-butylene glycol), materials for limiting polymer molecular weight (e.g., sodium dimethyldithiocarbamate, tetraethylene pentamine, mercaptans such as mercaptoethanol, and the like), acids, bases, and the like.

Component Concentrations and Ratios

The water-soluble, oil-insoluble ethylenically unsaturated monomer can be present in any practical concentration in the aqueous phase, but is generally is present in a concentration of from 50 or more to about 70, typically from about 55 to about 65, and preferably from about 60 to about 64, percent by weight based upon the total weight of the aqueous solution. When more than one monomer is utilized, the ratio of the different monomers can be any desired ratio, the choice of which will depend on the desired physicochemical properties of the polymer product, as is well known in the polymer arts.

The water-in-oil emulsion also generally contains an emulsifier in a concentration sufficient to emulsify the water and oil which amount is generally from about 1.0 to about 10.0, typically from about 1.5 to about 6.0, and preferably from about 2.0 to about 4.0, percent by weight based upon the total weight of the reaction mixture. The emulsifier can comprise a single surfactant or a combination of surfactants.

The relative weight ratio of water-to-oil phase can be any ratio that results in a suitable water-in-oil emulsion, and generally is in the range of 0.2 to about 4.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for continuous polymerization of ethylenically unsaturated monomers in a water-in-oil inverse emulsion under adiabatic conditions without the need for external cooling during the polymerization, the method comprising the steps of:
   (a) neutralizing a monomer composition comprising at least one water-soluble, oil-insoluble, ethylenically unsaturated acidic monomer with a base in an aqueous medium comprising water and water ice to form an aqueous monomer solution therefrom;
   (b) homogenizing the monomer solution with an oil phase in the presence of an emulsifier to form a water-in-oil inverse emulsion therefrom;
   (c) degassing the inverse emulsion;
   (d) initiating polymerization of the neutralized monomer composition after the homogenizing and degassing;
   (e) after initiating polymerization, passing the inverse emulsion through a tube reactor comprising inline static mixing elements, without cooling, at a flow rate sufficient to achieve a preselected degree of polymerization as the inverse emulsion exits the tube reactor; and
   (e) flash evaporating a portion of the water from inverse emulsion after it exits the tube reactor to cool and concentrate the resulting polymer-containing inverse emulsion;
   wherein during neutralization of the monomer composition, the aqueous medium comprises an amount of water ice sufficient to maintain the monomer solution at a temperature of 30° C. or less; and the polymerization is initiated by adding a free-radical polymerization initiator composition to the inverse emulsion prior to passing through the tube reactor.

2. The method of claim 1, wherein the polymerization initiator comprises a thermal initiator.

3. The method of claim 2, wherein the thermal initiator comprises one or more material selected from the group consisting of an azo compound, an organic peroxide, and a dialkyl hyponitrite.

4. The method of claim 2, wherein the thermal initiator comprises at least one azo compound selected from the group consisting of:
   2,2'-azobisisobutyronitrile,
   1,1'-azobis(cyclohexanecarbonitrile),
   2-t-butylazo-2-cyanopropane,
   2,2'-azobis(2,4-dimethylvaleronitrile),
   2,2'-azobis(2-amidinopropane)hydrochloride,
   2-t-butylazo-2-cyanopropane,
   2-t-butylazo-2-cyanobutane,
   2-t-butylazo-1-cyanocyclohexane, and
   2-t-butylazo-2-cyano-4-methoxy-4-methylpentane.

5. The method of claim 2, wherein the thermal initiator comprises at least one organic peroxide compound selected from the group consisting of:
   dibenzoyl peroxide,
   di-t-butyl peroxide,
   bis-dodecanoyl peroxide, and
   t-butyl peroxyacetate.

6. The method of claim 2, wherein the thermal initiator comprises at least one dialkyl hyponitrite selected from the group consisting of:
   di-t-butyl hyponitrite, and
   di-t-amyl hyponitrite.

7. The method of claim 1, wherein the polymerization initiator comprises a redox pair initiator composed of an oxidizing agent and a reducing agent.

8. The method of claim 7, wherein the oxidizing agent comprises a material selected from the group consisting of:
   hydrogen peroxide,
   an organic hydroperoxide,
   a bromate salt, and
   a chlorate salt.

9. The method of claim 7, wherein the reducing agent comprises a material selected from the group consisting of:
   a metabisulfite salt,
   a formaldehyde sulfoxylate salt,
   complexed $Fe^{2+}$ ion, and
   ascorbic acid.

10. The method of claim 1, wherein the polymerization initiator comprises a combination of a thermal initiator and a redox pair initiator composed of an oxidizing agent and a reducing agent.

11. The method of claim 10, wherein the oxidizing agent comprises a bromate ($BrO_3^-$) salt and the reducing agent comprises a metabisulfite ($S_2O_5^{2-}$) salt.

12. The method of claim 10, wherein the thermal initiator comprises 2,2'-azobis(2,4-dimethyl)valeronitrile.

13. The method of claim 10, wherein the thermal initiator and the oxidizing agent of the redox initiator pair are added to the aqueous monomer solution and oil phase prior to the homogenizing and degassing, and the reducing agent is added to the inverse emulsion after homogenizing and degassing, and before the passing of the monomer solution through the tube reactor.

14. The method of claim 1, wherein the emulsifier comprises at least one nonionic surfactant.

15. The method of claim 1, wherein monomer composition further comprises at least one water-soluble nonionic monomer.

16. The method of claim 15, wherein the acidic monomer comprises acrylic acid and the nonionic monomer comprises acrylamide.

17. The method of claim 1, wherein monomer composition further comprises at least one water-soluble cationic monomer.

18. The method of claim 1, wherein the inverse emulsion has an oil phase-to-water weight ratio is about 21:79 to about 23:77.

19. The method of claim 1, wherein up to about 10 percent of the water of the inverse emulsion is removed during the flash evaporation.

20. The method of claim 1, wherein the flow rate of the inverse emulsion through the tube reactor is selected to provide a residence time for the inverse emulsion in the tube reactor of about 6 to about 10 minutes.

* * * * *